(12) United States Patent
Pherson et al.

(10) Patent No.: US 12,091,239 B2
(45) Date of Patent: Sep. 17, 2024

(54) FORMED STRUCTURAL PANEL WITH OPEN CORE

(71) Applicant: Advanced Composite Structures, LLC, Charleston, SC (US)

(72) Inventors: Thomas R. Pherson, Daniel Island, SC (US); Michael Carter, Charleston, SC (US)

(73) Assignee: Advanced Composite Structures, LLC, Charleston, SC (US)

( * ) Notice: Subject to any disclaimer, the term of this patent is extended or adjusted under 35 U.S.C. 154(b) by 292 days.

(21) Appl. No.: 17/524,002

(22) Filed: Nov. 11, 2021

(65) Prior Publication Data

US 2023/0143092 A1     May 11, 2023

(51) Int. Cl.
     *B65D 90/02*     (2019.01)
     *B32B 3/06*       (2006.01)
     (Continued)

(52) U.S. Cl.
     CPC .............. *B65D 90/022* (2013.01); *B32B 3/06* (2013.01); *B32B 3/12* (2013.01); *B32B 5/18* (2013.01); *B32B 27/065* (2013.01); *B32B 27/281* (2013.01); *B32B 27/288* (2013.01); *B32B 27/32* (2013.01); *B32B 27/34* (2013.01);
     (Continued)

(58) Field of Classification Search
     CPC .... B65D 90/022; B65D 88/14; B65D 90/028; B65D 90/06; B32B 3/06; B32B 3/12; B32B 5/18; B32B 27/065; B32B 27/281; B32B 27/288; B32B 27/32; B32B 27/34; B32B 27/36; B32B 2262/0253; B32B 2262/0269; B32B 2262/101; B32B 2262/105; B32B 2262/106; B32B 2266/025; B32B 2266/08; B32B 2307/3065; B32B 2307/72; B32B 2307/732; B32B 2439/62
See application file for complete search history.

(56) References Cited

U.S. PATENT DOCUMENTS

| | | | |
|---|---|---|---|
| 1,557,382 | A | 10/1925 | Sundback |
| 2,495,636 | A | 1/1950 | Hoeltzel et al. |

(Continued)

FOREIGN PATENT DOCUMENTS

| | | |
|---|---|---|
| AT | 129980 T | 11/1995 |
| AU | 672004 B2 | 9/1996 |

(Continued)

OTHER PUBLICATIONS

International Search Report and Written Opinion for PCT Application PCT/IB2022/060846 issued Feb. 16, 2023, 14 pages.

(Continued)

*Primary Examiner* — Kareen K Thomas
(74) *Attorney, Agent, or Firm* — Womble Bond Dickinson (US) LLP

(57) ABSTRACT

A panel includes a first board, a second board, and an edge cap. The first board and the second board each including a core that is sandwiched between and bonded to a first skin and a second skin. The edge cap is positioned between and bonded to the first board and the second board such that a cavity is defined by the first board, the second board, and the edge cap. The cavity is configured to receive an insert and is isolated from forces transferred between the first board and the second board.

20 Claims, 5 Drawing Sheets

(51) Int. Cl.
  *B32B 3/12* (2006.01)
  *B32B 5/18* (2006.01)
  *B32B 27/06* (2006.01)
  *B32B 27/28* (2006.01)
  *B32B 27/32* (2006.01)
  *B32B 27/34* (2006.01)
  *B32B 27/36* (2006.01)
  *B65D 88/14* (2006.01)

(52) U.S. Cl.
  CPC .............. *B32B 27/36* (2013.01); *B65D 88/14* (2013.01); *B65D 90/028* (2013.01); *B32B 2262/0253* (2013.01); *B32B 2262/0269* (2013.01); *B32B 2262/101* (2013.01); *B32B 2262/105* (2013.01); *B32B 2262/106* (2013.01); *B32B 2266/025* (2013.01); *B32B 2266/08* (2013.01); *B32B 2307/3065* (2013.01); *B32B 2307/72* (2013.01); *B32B 2307/732* (2013.01); *B32B 2439/62* (2013.01)

(56) References Cited

U.S. PATENT DOCUMENTS

| | | |
|---|---|---|
| 3,160,307 A | 12/1964 | Morrison |
| 3,161,258 A | 12/1964 | Chapman |
| 3,165,760 A | 1/1965 | Aram |
| 3,251,399 A | 5/1966 | Grossman |
| 3,372,729 A | 3/1968 | Lindenmayer |
| 3,556,448 A | 1/1971 | Dobbs |
| 3,558,423 A | 1/1971 | Rossetti, Jr. |
| 3,586,013 A | 6/1971 | Gladden |
| 3,591,034 A | 7/1971 | Lohr |
| 3,616,838 A | 11/1971 | Barr |
| 3,657,036 A | 4/1972 | Mullenhoff et al. |
| 3,657,042 A | 4/1972 | Rerolle |
| 3,671,542 A | 6/1972 | Kwolek |
| 3,709,552 A | 1/1973 | Broadbent |
| 3,723,234 A | 3/1973 | MacDonald |
| 3,785,694 A | 1/1974 | Sargent |
| 3,856,072 A | 12/1974 | Sund |
| 3,951,284 A | 4/1976 | Fell |
| 4,046,186 A | 9/1977 | Nordstrom |
| 4,131,150 A | 12/1978 | Papadakis |
| 4,137,394 A | 1/1979 | Meihuizen |
| 4,212,406 A | 7/1980 | Mittelmann |
| 4,221,256 A | 9/1980 | Karaki |
| 4,284,119 A | 8/1981 | Martin |
| 4,304,824 A | 12/1981 | Karpinski |
| 4,335,774 A | 6/1982 | Price |
| 4,356,138 A | 10/1982 | Kavesh |
| 4,391,865 A | 7/1983 | Constance |
| 4,406,318 A | 9/1983 | Cukierski |
| 4,413,110 A | 11/1983 | Kavesh |
| 4,424,253 A | 1/1984 | Anderson |
| 4,429,730 A | 2/1984 | Elston |
| 4,440,711 A | 4/1984 | Kwon |
| 4,457,985 A | 7/1984 | Harpell |
| 4,493,870 A | 1/1985 | Vrouenraets |
| 4,535,027 A | 8/1985 | Kobashi |
| 4,538,663 A | 9/1985 | Looker |
| 4,545,611 A | 10/1985 | Broadbent |
| 4,557,961 A | 12/1985 | Gorges |
| 4,597,818 A | 7/1986 | Aoyama |
| 4,599,267 A | 7/1986 | Kwon |
| 4,600,235 A | 7/1986 | Frederick |
| 4,601,405 A | 7/1986 | Riemer |
| 4,738,371 A | 4/1988 | Wakeman |
| 4,780,351 A | 10/1988 | Czempoyesh |
| 4,795,047 A | 1/1989 | Dunwoodie |
| 4,802,233 A | 1/1989 | Skamser |
| 4,852,316 A | 8/1989 | Webb |
| 4,863,779 A | 9/1989 | Daponte |
| 4,874,648 A | 10/1989 | Hill |
| 4,876,774 A | 10/1989 | Kavesh |
| 4,894,281 A | 1/1990 | Yagi |
| 4,895,878 A | 1/1990 | Jourquin |
| 4,911,317 A | 3/1990 | Schloesser |
| 4,957,804 A | 9/1990 | Hendrix |
| 4,983,433 A | 1/1991 | Shirasaki |
| 4,983,449 A | 1/1991 | Nee |
| 4,991,640 A | 2/1991 | Verkindt |
| 5,082,721 A | 1/1992 | Smith, Jr. |
| 5,105,970 A | 4/1992 | Malone |
| 5,143,245 A | 9/1992 | Malone |
| 5,160,472 A | 11/1992 | Zachariades |
| 5,160,767 A | 11/1992 | Genske |
| 5,169,697 A | 12/1992 | Langley |
| 5,183,176 A | 2/1993 | Meier |
| 5,248,364 A | 9/1993 | Liu |
| 5,249,534 A | 10/1993 | Sacks |
| 5,261,536 A | 11/1993 | Wilson |
| 5,266,390 A | 11/1993 | Garland |
| 5,284,540 A | 2/1994 | Roth |
| 5,286,576 A | 2/1994 | Srail |
| 5,360,129 A | 11/1994 | Lee |
| 5,377,856 A | 1/1995 | Brierton |
| 5,389,448 A | 2/1995 | Schirmer |
| 5,395,682 A | 3/1995 | Holland |
| 5,398,831 A | 3/1995 | Avramides |
| 5,401,344 A | 3/1995 | Dickson |
| RE34,892 E | 4/1995 | Dunwoodie |
| 5,431,284 A | 7/1995 | Wilson |
| 5,443,874 A | 8/1995 | Tachi |
| 5,445,883 A | 8/1995 | Kobayashi et al. |
| 5,454,471 A | 10/1995 | Norvell |
| 5,460,884 A | 10/1995 | Kobylivker |
| 5,472,760 A | 12/1995 | Norvell |
| 5,480,706 A | 1/1996 | Li |
| 5,490,567 A | 2/1996 | Speer |
| 5,500,305 A | 3/1996 | Bridges et al. |
| 5,529,363 A | 6/1996 | Borowski, Jr. |
| 5,547,536 A | 8/1996 | Park |
| 5,567,498 A | 10/1996 | McCarter |
| 5,570,801 A | 11/1996 | Younger |
| 5,578,373 A | 11/1996 | Kobayashi |
| 5,601,201 A | 2/1997 | Looker |
| 5,601,897 A | 2/1997 | Vermilion et al. |
| 5,652,041 A | 7/1997 | Buerger |
| 5,658,037 A | 8/1997 | Evans |
| 5,667,002 A | 9/1997 | Neustadt |
| 5,677,029 A | 10/1997 | Prevorsek |
| 5,702,657 A | 12/1997 | Yoshida |
| 5,761,854 A | 6/1998 | Johnson |
| 5,789,327 A | 8/1998 | Rousseau |
| 5,819,474 A | 10/1998 | Strom |
| 5,851,668 A | 12/1998 | Sandor |
| 5,867,002 A | 2/1999 | Dauvergne |
| 5,888,610 A | 3/1999 | Fournier |
| 5,915,445 A | 6/1999 | Rauenbusch |
| 5,916,672 A | 6/1999 | Reeves et al. |
| 5,927,025 A | 7/1999 | Brockman |
| 5,958,805 A | 9/1999 | Quinones |
| 5,976,998 A | 11/1999 | Sandor |
| 5,979,684 A | 11/1999 | Ohnishi |
| 6,054,205 A | 4/2000 | Newman |
| 6,080,474 A | 6/2000 | Oakley |
| 6,103,372 A | 8/2000 | Sandor |
| 6,112,931 A | 9/2000 | Booth et al. |
| 6,113,031 A | 9/2000 | Williams |
| 6,156,682 A | 12/2000 | Fletemier |
| 6,161,714 A | 12/2000 | Matsuura |
| 6,164,030 A | 12/2000 | Dietrich |
| 6,237,793 B1 | 5/2001 | Fingerhut |
| 6,280,546 B1 | 8/2001 | Holland |
| 6,291,049 B1 | 9/2001 | Kunkel et al. |
| 6,322,873 B1 | 11/2001 | Orologio |
| 6,358,591 B1 | 3/2002 | Smith |
| 6,435,101 B1 | 8/2002 | Marker |
| 6,446,751 B1 | 9/2002 | Ahuja |
| 6,503,856 B1 | 1/2003 | Broadway et al. |
| 6,511,730 B1 | 1/2003 | Blair |
| 6,513,703 B2 | 2/2003 | Becker |
| 6,701,948 B2 | 3/2004 | Jopp |

(56) References Cited

U.S. PATENT DOCUMENTS

| | | |
|---|---|---|
| 6,711,872 B2 | 3/2004 | Anderson |
| 6,749,076 B2 | 6/2004 | Fingerhut |
| 6,755,232 B1 | 6/2004 | Holland et al. |
| 6,758,057 B2 | 7/2004 | Vince, II et al. |
| 6,787,228 B2 | 9/2004 | Campbell |
| 6,800,367 B2 | 10/2004 | Hanyon |
| 6,802,551 B2 | 10/2004 | Nelson |
| 6,818,091 B1 | 11/2004 | Holland |
| 6,825,137 B2 | 11/2004 | Fu |
| 6,918,501 B2 | 7/2005 | Wang |
| 6,926,188 B2 | 8/2005 | Hazeyama |
| 6,962,188 B2 | 11/2005 | Coenraets |
| 6,992,027 B1 | 1/2006 | Buckingham |
| 7,001,857 B2 | 2/2006 | Degroote |
| 7,087,300 B2 | 8/2006 | Hanyon |
| 7,111,661 B2 | 9/2006 | Laugenbach |
| 7,112,299 B2 | 9/2006 | Merrick |
| 7,114,756 B2 | 10/2006 | Nelson |
| 7,195,025 B2 | 3/2007 | Choi |
| 7,210,492 B2 | 5/2007 | Gerrie |
| 7,264,878 B2 | 9/2007 | Miller |
| 7,311,216 B2 | 12/2007 | Donnelly et al. |
| 7,622,406 B2 | 11/2009 | Holland et al. |
| D617,522 S | 6/2010 | Teien |
| 7,748,172 B2 | 7/2010 | Zupancich et al. |
| 7,785,693 B2 | 8/2010 | Johnson |
| 7,805,897 B2 | 10/2010 | Holland |
| 7,820,570 B2 | 10/2010 | Holland et al. |
| 7,828,029 B2 | 11/2010 | Holland et al. |
| 7,846,528 B2 | 12/2010 | Johnson |
| D630,815 S | 1/2011 | Teien |
| 7,901,537 B2 | 3/2011 | Jones |
| 7,913,511 B2 | 3/2011 | Meyer |
| 7,972,698 B2 | 7/2011 | Miller |
| 8,002,919 B2 | 8/2011 | Johnson |
| 8,322,955 B2 | 12/2012 | Arnesen |
| 8,342,588 B2 | 1/2013 | Skaradzinski |
| 8,445,937 B2 * | 5/2013 | Carcia .................. H10K 50/844 |
| | | 257/E33.059 |
| 8,479,801 B2 | 7/2013 | Holland et al. |
| 8,784,605 B2 | 7/2014 | Fingerhut |
| 8,839,842 B2 | 9/2014 | Ashelin |
| 8,973,769 B2 | 3/2015 | Huber |
| 9,051,014 B2 | 6/2015 | Lookebill |
| 9,090,392 B2 | 7/2015 | Loeschen |
| D740,555 S | 10/2015 | Huber |
| D740,556 S | 10/2015 | Huber |
| 9,174,796 B2 | 11/2015 | Pherson et al. |
| 9,174,797 B2 | 11/2015 | Pherson et al. |
| 9,248,958 B2 | 2/2016 | Pherson |
| 9,296,555 B2 | 3/2016 | Kawka |
| 9,487,953 B2 | 11/2016 | Nagarajan et al. |
| 9,827,529 B2 | 11/2017 | Rebouillat |
| 9,834,374 B2 | 12/2017 | Pherson |
| 9,930,997 B2 | 4/2018 | Larpenteur |
| 10,894,661 B2 | 1/2021 | Pherson et al. |
| 11,084,652 B2 | 8/2021 | Pherson et al. |
| 2001/0001466 A1 | 5/2001 | Fingerhut |
| 2002/0114937 A1 | 8/2002 | Albert |
| 2003/0098250 A1 | 5/2003 | Sabounjian |
| 2003/0106414 A1 | 6/2003 | Wang |
| 2004/0017789 A1 | 1/2004 | Hoynck |
| 2004/0045847 A1 | 3/2004 | Fairbank |
| 2004/0058119 A1 | 3/2004 | Wynne |
| 2004/0058603 A1 | 3/2004 | Hayes |
| 2004/0092379 A1 | 5/2004 | Lewis |
| 2004/0105994 A1 | 6/2004 | Lu |
| 2004/0112907 A1 | 6/2004 | Donnelly et al. |
| 2004/0195967 A1 * | 10/2004 | Padiyath .................. B32B 27/08 |
| | | 313/512 |
| 2004/0226309 A1 | 11/2004 | Broussard |
| 2005/0016643 A1 | 1/2005 | Mathies et al. |
| 2005/0074593 A1 | 4/2005 | Day |
| 2005/0109382 A1 | 5/2005 | Choi |
| 2005/0142971 A1 | 6/2005 | Chen |
| 2005/0211839 A1 | 9/2005 | Movsesian |
| 2006/0006174 A1 * | 1/2006 | Bucher .................. B65D 90/022 |
| | | 220/1.5 |
| 2006/0035555 A1 | 2/2006 | Narayanan |
| 2006/0138911 A1 | 6/2006 | Ransom |
| 2006/0159887 A1 * | 7/2006 | Rajabali .................. B32B 15/20 |
| | | 428/138 |
| 2006/0189236 A1 | 8/2006 | Davis |
| 2006/0239791 A1 | 10/2006 | Morris |
| 2007/0169885 A1 * | 7/2007 | Mikuni ...................... C09J 9/00 |
| | | 156/325 |
| 2007/0178283 A1 * | 8/2007 | Tigerfeldt ............... B32B 15/20 |
| | | 428/34.1 |
| 2007/0256379 A1 | 11/2007 | Edwards |
| 2007/0258767 A1 * | 11/2007 | Tapp ..................... E04H 1/1205 |
| | | 427/136 |
| 2007/0289682 A1 | 12/2007 | Young |
| 2008/0003075 A1 | 1/2008 | Mapitigama |
| 2008/0070024 A1 | 3/2008 | Curran |
| 2008/0102721 A1 | 5/2008 | Holland et al. |
| 2008/0110580 A1 | 5/2008 | Hoerner |
| 2008/0145592 A1 | 6/2008 | Johnson |
| 2008/0197649 A1 | 8/2008 | Byler |
| 2008/0302049 A1 | 12/2008 | Stoneburner |
| 2008/0311336 A1 | 12/2008 | Dolgopolsky |
| 2008/0313980 A1 | 12/2008 | Holland |
| 2009/0004393 A1 | 1/2009 | Rodgers |
| 2009/0062432 A1 | 3/2009 | Doesburg |
| 2009/0140097 A1 | 6/2009 | Collier |
| 2009/0183808 A1 | 7/2009 | Sappington |
| 2009/0209155 A1 | 8/2009 | Goulet |
| 2009/0258180 A1 | 10/2009 | Goulet |
| 2010/0132894 A1 | 6/2010 | Knutson |
| 2010/0209679 A1 | 8/2010 | Tompkins |
| 2010/0243807 A1 | 9/2010 | Hossain |
| 2010/0270318 A1 | 10/2010 | Dagher |
| 2011/0091713 A1 | 4/2011 | Miller |
| 2011/0136401 A1 | 6/2011 | Hanusa |
| 2011/0180959 A1 | 7/2011 | Donnelly |
| 2011/0274915 A1 | 11/2011 | Roberson |
| 2012/0018102 A1 | 1/2012 | Ungs |
| 2012/0111862 A1 | 5/2012 | Siegbert |
| 2012/0118881 A1 | 5/2012 | Holland |
| 2012/0118882 A1 | 5/2012 | Holland |
| 2012/0151851 A1 | 6/2012 | Cantin |
| 2012/0266561 A1 | 10/2012 | Piedmont |
| 2013/0032260 A1 | 2/2013 | Davies |
| 2013/0161331 A1 | 6/2013 | Pherson |
| 2013/0340953 A1 | 12/2013 | Knutson |
| 2014/0329429 A1 | 11/2014 | Eleazer |
| 2014/0335750 A1 | 11/2014 | Adams |
| 2015/0013275 A1 | 1/2015 | Davies |
| 2015/0053086 A1 | 2/2015 | Rebouillat |
| 2015/0210035 A1 | 7/2015 | Rippel et al. |
| 2015/0246511 A1 | 9/2015 | Lookebill |
| 2015/0246749 A1 | 9/2015 | Huber |
| 2015/0267396 A1 | 9/2015 | Cantin |
| 2015/0343736 A1 | 12/2015 | Kawka |
| 2016/0039172 A1 | 2/2016 | Kawka |
| 2016/0046441 A1 | 2/2016 | Holland et al. |
| 2016/0107816 A1 | 4/2016 | Larpenteur et al. |
| 2016/0130066 A1 | 5/2016 | Ranade et al. |
| 2016/0137408 A1 | 5/2016 | Pherson |
| 2016/0332417 A1 | 11/2016 | Kawka |
| 2017/0043687 A1 | 2/2017 | Preisler |
| 2017/0096295 A1 | 4/2017 | Pherson et al. |
| 2017/0108261 A1 | 4/2017 | Broussard |
| 2018/0290827 A1 | 10/2018 | Pherson |
| 2020/0407149 A1 | 12/2020 | Pherson et al. |

FOREIGN PATENT DOCUMENTS

| | | |
|---|---|---|
| CA | 2134668 A1 | 11/1993 |
| CN | 207585186 U | 7/2018 |
| CN | 114206602 A | 3/2022 |
| DE | 3004699 A1 | 8/1980 |
| DE | 4441842 A1 | 6/1995 |
| DE | 69300769 T2 | 7/1996 |

(56) References Cited

FOREIGN PATENT DOCUMENTS

| | | |
|---|---|---|
| DK | 0639150 T3 | 1/1996 |
| EP | 0520745 A1 | 12/1992 |
| EP | 0639150 A1 | 2/1995 |
| EP | 2734458 A2 | 5/2014 |
| EP | 3990271 A1 | 5/2022 |
| ES | 2079979 T3 | 1/1996 |
| GB | 995420 A | 6/1965 |
| GB | 2051667 A | 1/1981 |
| GB | 2251925 A | 7/1992 |
| GB | 2349140 A | 10/2000 |
| GB | 2501053 A | 10/2013 |
| JP | S5388072 A | 8/1978 |
| JP | H07506074 A | 7/1995 |
| JP | H11210353 A | 8/1999 |
| JP | 2004203395 A | 7/2004 |
| WO | 9322223 A1 | 11/1993 |
| WO | 2001074688 A1 | 10/2001 |
| WO | WO2004071885 | 8/2004 |
| WO | 2005016643 A1 | 2/2005 |
| WO | 2008054731 A2 | 5/2008 |
| WO | 2010088811 A1 | 8/2010 |
| WO | 2012085212 A2 | 6/2012 |
| WO | 2013012782 A2 | 1/2013 |
| WO | 2013106640 A1 | 7/2013 |
| WO | 2015108422 A1 | 7/2015 |
| WO | 2018142133 A1 | 8/2018 |
| WO | 2020264346 A1 | 12/2020 |
| ZA | 932975 B | 4/1994 |

OTHER PUBLICATIONS

Pending PCT Application No. PCT/IB2022/060846 filed Nov. 10, 2022.
English abstract of DE4441842, Nov. 3, 1997, 18 pgs.
English abstract of JP 11210353, last printed Dec. 31, 2015, 2 pgs.
English translation of the abstract of DE 3004699, last printed Oct. 17, 2011, 3 pgs.
Internet advertisement for Pitched-based Carbon Fiber/Composite, http://www.nsc.co.jp/nsmat/English/business_domain/bd09.html, last printed Jan. 31, 2012, 2 pgs.
Internet advertisement for Transonite Sandwich Panels, http://www.ebertcomposites.com/transonite.html, last printed Jan. 31, 2012, 2 pgs.
Internet advertisement for Vince Kelly's Carbon-Fiber Technology, http://www.goecities.com/capecanaveral/1320/, last printed Jan. 31, 2012, 16 pgs.
Internet Wikipedia encyclopedia on Carbon (fiber), http://en.wikipedia.org/wiki/Carbon_(fiber), last printed Jan. 31, 2012, 5 pgs.
Supreme Zipper Industries, Zipper Chain, 2010 copyright, last printed Dec. 31, 2015, 2 pgs.
Supreme Zipper Industries, Zipper Terminology Guide, 2010 copyright, last printed Dec. 31, 2015, 10 pgs.
Hammond et al. "Application of Vacuum Insulation Panel in the cold chain—Analysis of viability", London South Bank University, Jul. 28, 2014.
International Preliminary Report on Patentability for PCT/IB2022/060846, dated May 23, 2024, 8 pgs.

* cited by examiner

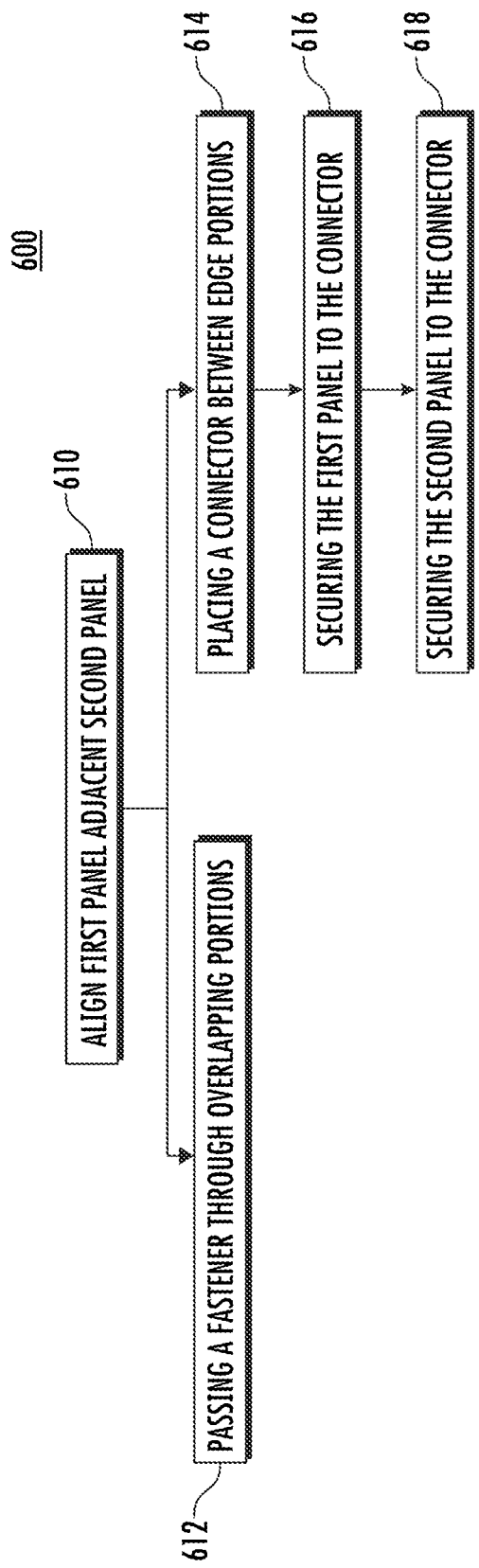

FORMED STRUCTURAL PANEL WITH OPEN CORE

TECHNICAL FIELD

The present disclosure relates to the field of transportation, and, more particularly, to structural panels. The structural panels may be used as insulated structural panels for insulated cargo containers or insulated walls for structures.

BACKGROUND

Air cargo is typically transported in a container generally referred to as Unit Load Device ("ULD"), which is stowed in a cargo hold of an aircraft, which can either be below and/or above the deck, e.g., below the deck in a passenger aircraft or below and above the deck in transport aircraft. The outer size and shape of ULDs vary depending upon the type of aircraft such that the outer dimensions of the ULDs are determined by the type of aircraft. Typically, and regardless of the shape or geometry of the container, one end or side of the ULD is open for loading and unloading cargo. Various door closures can be used for opening and closing the open ends ULDs. The unloaded weight of the ULD is significant as even a slight reduction in the unloaded weight of the ULD will result in substantial savings in the cost of fuel to transport the ULD over its life. In addition, a reduction in the unloaded weight of the ULD will allow for an increased weight capacity for cargo.

Transporting perishable air cargo may require a ULD to be insulated and/or refrigerated. Some perishable air cargo may require an interior of a ULD to be maintained below a specific temperature or within a specific temperature range. Typically to insulate a ULD, insulated panels including foam cores or foam cores with air pockets have been used to achieve a suitable R-value. The foam cores generally have an R-value of R-5 per inch and tend to be thick, e.g., at least 1 inch, to achieve a suitable R-value. The thickness of the panels may reduce cargo space within a ULD and/or increase an unloaded weight of the ULD. Generally, to refrigerate a ULD, specialized refrigeration equipment that is certified for use in aircraft is used and disposed within the ULD or secured to the ULD. The specialized refrigeration equipment can also include batteries that are certified for use in aircraft. The refrigeration equipment and batteries tend to be heavy and bulky increasing the weight of the ULD and reducing cargo space of a ULD.

Structural panels have also been used as a building material to form walls for fixed structures and buildings. It may be beneficial to insulate such structural panels to reduce thermal transfer into or out of the structure formed of the structural panels. For example, insulating structural panels may improve a thermal efficiency of a heating and cooling system of a building formed of the structural panels.

SUMMARY

The present disclosure is directed to a structural panel that is formed from a first board and a second board that are spaced apart from one another to define a cavity therebetween. Each of the first board and the second board include a core sandwiched between two skins. The first board and the second board are spaced apart by one or more edge caps that are configured to transfer forces between the first board and the second board such that the cavity is isolated from the forces being transferred between the first board and the second board.

In an embodiment of the present disclosure, a panel includes a first board, a second board, and an edge cap. The first board includes a first core that is sandwiched between and bonded to a first skin and a second skin. The second board includes a second core that is sandwiched between and bonded to a third skin and a fourth skin. The edge cap is positioned between and bonded to the first board and the second board such that a cavity is defined by the first board, the second board, and the edge cap. The cavity is configured to receive an insert with the cavity being isolated from forces transferred between the first board and the second board.

In embodiments, the edge cap is configured to transfer shear forces between the first board and the second board. The insert may be disposed within the cavity. The insert may be an insulative insert, a fire-resistant insert, or signal-blocking insert. The insert may be a vacuum insulated panel. The insert may be bonded to the first board or the second board. The insert may be encapsulated in a non-combustible fabric to contain the contents of the insert and prevent burn-through.

In some embodiments, portions of the first board, the second board, and the edge cap may be thermoformed into an edge profile. Portions of the first skin, the second skin, the third skin, and the fourth skin may be consolidated together to form the edge profile. The edge profile may include an arcuate section. The edge profile may include a flat edge section.

In certain embodiments, the first skin has a first thickness and the second skin has a second thickness that is different from the first thickness. The first skin may have a first composition and the second skin may have a second composition different from the first skin.

In another embodiment of the present disclosure, a cargo container includes a first panel and a second panel as disclosed and described herein. The first panel has a first edge portion and the second panel has a second edge portion. The second panel is joined to the first panel such that the first edge portion is adjacent the second edge portion.

In embodiments, the first edge portion is secured directly to the second edge portion. The cargo container may include a frame element that is disposed between the first edge portion and the second edge portion. The first edge portion and the second edge portion may each be secured directly to the frame element.

In another embodiment of the present disclosure, a panel includes a first board, a second board, and a cap. The first board includes a first core that has a first skin bonded on a first side of the first core and a second skin that is bonded on a second side of the first core that is opposite the first side. The second board includes a second core that has a third skin bonded to a first side of the second core and a fourth skin that is bonded on a second side of the second core that is opposite the first side of the second skin. The cap is positioned between and bonded to the first board and the second board such that a cavity is defined by the first board, the second board, and the cap. The cap is configured to transfer shear forces between the first board to the second board.

In embodiments, the panel includes an insert that is disposed within the cavity. The insert may be isolated from shear forces of the first board and the second board. The first board, the second board, and the edge cap may be thermoformed into an edge profile.

In another embodiment of the present disclosure, a method of manufacturing a panel includes positioning an end cap on a first board, positioning a second board on the end cap such that a cavity is defined by the end cap, and thermoforming a portion of the first board, the second board, and the end cap such that the first board, the second board, and the end cap are bonded together to form an edge profile of the panel. The first board includes a first skin, a second skin, and a first core that is disposed between and bonded to the first skin and the second skin. The second board has a third skin, a fourth skin, and a second core that is disposed between and bonded to the third skin and the fourth skin.

In embodiments, thermoforming the portion of the first board, the second board, and the end cap may include consolidating the first skin, the second skin, the third skin, and the fourth skin in the edge profile of the panel.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein:

FIG. 8 is a flow chart of a method of assembling a structure provided in accordance with an embodiment of the present disclosure.

DETAILED DESCRIPTION

Figure 1:
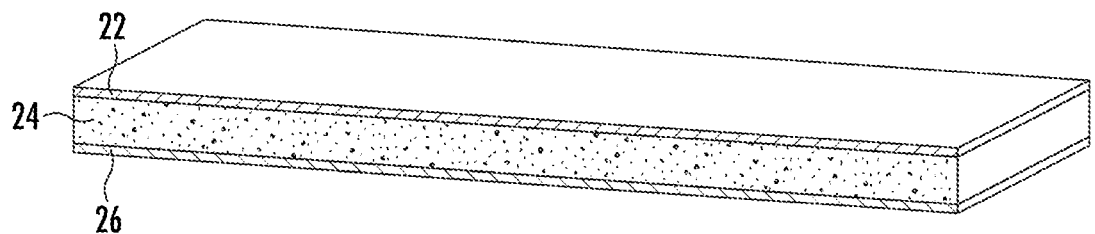
FIG. 1 is a cut-away, perspective view of a structural board provided in accordance with an embodiment of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise.

In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

As used in the description and the appended claims, the phrases "unit load device" (ULD) or "air cargo container," is defined as containers used to load luggage, freight, mail, and the like on aircraft including wide-body aircraft and narrow-body aircraft. While the containers described herein are directed to ULDs for use with aircraft, it is contemplated that cargo containers including the disclosed vacuum insulated panels may be used in other transportation vehicles such as trucks, trailers, ships, or trains such that the described use with aircraft should not be seen as limiting. In addition, while the panels described herein are described with respect to forming air cargo containers, it is contemplated that the panels described herein may be used with other transportation vehicles or as structural panels for construction such as interior or exterior walls, refrigerator panels, etc. As used herein, the term "vacuum" refers to a pressure of $3 \times 10^3$ Pa or less.

The temperature of cargo within a ULD designed with thermal insulation properties in mind may extend how long cargo is able to maintain a desired internal temperature. The desired internal temperature may be above or below an ambient temperature. Specifically, while an aircraft idles on the ground waiting to take off, during flight, and during unloading of the aircraft. In addition, a thermally insulated ULD may maintain an internal temperature range with a decreased amount of passive temperature control material, e.g., dry ice, or a decreased size of active cooling/heating equipment, e.g., refrigeration/heating equipment.

Referring now to FIG. 1, a structural board is provided in accordance with an embodiment of the present disclosure which is referred to generally as board 20. The board 20 may be a thermoplastic panel that can be formed into different shapes under heat and pressure. The board 20 is a composite panel including a top or first skin 22, a core 24, and a bottom or second skin 26 that are bonded together to form a sandwich panel. The first skin 22 and the bottom skin 26 may be fiber-reinforced thermoplastic resin. The fibers of the first skin 22 and/or the bottom skin 26 may include thermoplastic fibers such as fiberglass fibers, carbon fibers, aramid fibers, ceramic fibers, other fibers typically used in composite construction, or combinations thereof. The resin of the first skin 22 and/or the bottom skin 26 may be a thermoplastic resin such as polypropylene, polyester, nylon, polyetherimide (PEI), polyether ether ketone (PEEK), or other thermoplastic resin used in the composites industry.

The skins 22, 26 may be the same or may be different. For example, the first skin 22 may have a thickness greater or lesser than the second skin 26. Additionally or alternatively, the fibers and/or the resin of the first skin 22 and the second skin 26 may be the same or different from one another. The first skin 22 and the second skin 26 may differ based on the ultimate position of the skin 22, 26 in a final panel assembly as detailed below. For example, the first skin 22 may be configured to be exposed to external elements and the second skin 26 may be configured to be an internal layer protected from external elements as detailed below. In some embodiments, the first skin 22 or the second skin 26 may include fiberglass fibers and a polypropylene resin of which the fiberglass fibers may account for 64% of the weight of the particular skin 22, 26.

In certain embodiments, the first skin 22 and the second skin 26 may comprise fiberglass fibers, aramid fibers including Kevlar fibers, ultra-high molecular weight polyethylene (UHMWPE) fibers, carbon fibers, polypropylene fibers, or a wide variety of medium to high modulus fibers. The fibers forming the first skin 22 or the second skin 26 may be woven into a cloth or laid up as unidirectional plies. The first skin 22 or the second skin 26 may have a thickness in a range of 0.05 mm to 3 mm, e.g., in a range of 0.5 mm to 1 mm. In certain embodiments, the first skin 22 or the second skin 26 may have thickness greater than 3 mm. The thickness of the first skin 22 or the second skin 26 may be optimized based on structural strength, impact resistance, weight, and cost.

For example, a fiberglass/polypropylene skin having a thickness of 0.4 mm has been tested and shown to handle required structural loading for a ULD panel when properly designed and manufactured. A skin having a thickness of 0.4 mm may provide a superior weight and cost. During use, ULD panels and skins forming ULD panels may be impacted by forklift tines. Managing this impact and avoiding damage requiring repair is a key requirement of panels for ULDs. A skin having a thickness of 0.4 mm may performs better than aluminum which is commonly used in this application. Since one of the goals of this type of product construction is to minimize operating costs and downtime, a calculation can be made to optimize impact resistance with weight and cost (assuming that structural requirements are met). The thickness of impact facing skins may be increased to absorb higher impacts without visual damage.

As noted above, the board 20 may be thermoformed and pressure formed into different shapes. During the forming process, fibers of the skins 22, 26 may wrinkle instead of stretching. This wrinkling may reduce the compressive strength of the respective skin 22, 26 and thus, the board 20 as a whole. As such, the geometry of the fibers of the skins 22, 26 may be designed to account for a subsequent forming process as detailed below. The orientation or geometry of the fibers of the skins 22, 26 may depend on a location within the skin 22, 26. For example, the fibers of adjacent edges may have orientations that are perpendicular to one another with opposite edges having similar orientations.

The core 24 provides compressive strength and may increase durability of the board 20. The core 24 is designed to have a shear strength and compressive strength that is sufficient to transfer loads between the first skin 22 and the second skin 26. The core 24 may be a foam core, honeycomb core, or a foam-filled thermoplastic honeycomb core. A honeycomb core may provide increased shear strength or compressive strength compared to a foam core, a honeycomb core may have a lower insulation value relative to a foam core. A foam-filled honeycomb core may provide the strength of a honeycomb core with an insulation value approaching that of a fully foam core. In some embodiments, the core 24 includes a closed-cell foam. In embodiments where the core 24 includes a foam, the density of the foam may be selected to balance the structural strength of a dense foam with the insulative value of a less dense foam. The foam used to form a foam core may balance the strength requirements of the core 24 with the weight of the core 24. This balance is important in applications where weight of the overall panel 10 is important such as when the panel is used to form a ULD or to form other panels for use in aircraft or shipping. While a denser foam may provide greater structural strength, denser foams may have a lower insulation value. In particular embodiments, the core 24 includes a closed-cell polypropylene foam that has a density of 64 kg/m$^3$.

In embodiments, the thickness of the core 24 may vary from 6 mm to 75 mm. In some embodiments, the core 24 may have a thickness less than 6 mm or a thickness greater than 75 mm. The thickness of the core 24 may be increased to provide an improved insulation value. The thickness of the core 24 may be decreased to improve transfer of shear loading between the skins 22, 26 such that a thin core 24 may create a stiff and strong composite sandwich panel. As the thickness of the core 24 increases, the shear modulus of the core 24 may be increased to effectively transfer shear forces between the skins 22, 26. To increase a shear modulus of the core 24, a density of the core 24 may be increased. Increasing the density of the core 24 may reduce the insulation value of the core 24 and increase the weight of the core 24. A decrease in the insulation value of the core or an increase in weight of the core are undesirable. A method of optimizing a thickness of the core 24 is discussed below in greater detail.

The first skin 22 and the second skin 26 are bonded to the core 24 such that shear loads are transferred between the skins 22, 26 through the core 24. The core 24 may be sandwiched between the first skin 22 and the second skin 26 under pressure and/or heat to form the board 20. The bond between the skins 22, 26 prevents delamination which would result in a significant reduction in stiffness of the board 20. In embodiments where the core 24 includes a foam, the foam of the core 24 may be compatible with the resin of the first skin 22 or the second skin 26 such that a bond between the skins 22, 26 have sufficient strength.

Figure 2:
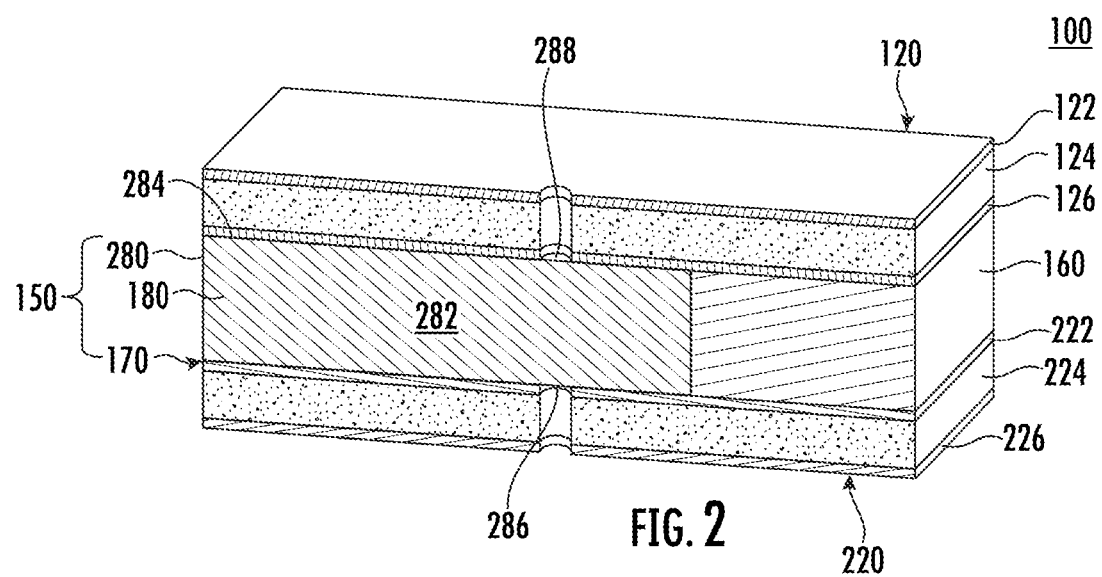
FIG. 2 is a cut-away, perspective view of a structural panel provided in accordance with an embodiment of the present disclosure.

With reference to FIG. 2, a structural panel is provided in accordance with embodiments of the present disclosure and is referred to generally as panel 100. The panel 100 includes a first board 120, a second board 220, and a central core 150 positioned between the first board 120 and the second board 220. The first board 120 and the second board 220 are each a structural board with a first skin 122, 222; a second skin 126, 226; and a core 124, 224 as detailed above with respect to board 20.

The central core 150 includes end portions or caps 160 that extend along the external edges of the central core 150 and are bonded to opposing skins 126, 222 of the first board 120 and the second board 220. The caps 160 are formed of a thermoplastic foam. The thermoplastic foam of the caps 160 may be compatible with the resin of the internal skins 126, 222 of the first board 120 and the second board 220 such that the caps 160 are structurally bonded to the first board 120 and the second board 220. In addition, the thermoplastic foam of the caps 160 may have one or more properties similar to foam of the cores 124, 224 of the first board 120 and the second board 220. For example, the foam of the caps 160 may have a melt rate similar to the cores 124, 224.

The central core 150 includes a cavity 170 defined by the second or internal skin 126 of the first board 120, the first or internal skin 222 of the second board 220, and each of the caps 160. The caps 160 are bonded to the first board 120 and the second board 220 such that shear forces and compressive forces are transferred between the first board 120 and the second board 220 through the caps 160. The caps 160 may allow for all of the shear forces and the compressive forces to be transferred between the first board 120 and the second board 220 with the cavity 170 being isolated from experiencing shear forces and compressive forces experienced by the first board 120 or the second board 220. The construction of the first board 120 and the second board 220 provide structural strength of the panel 100. In addition, the stiffness of the first board 120 and the second board 220 prevent bowing or "oil-canning" of the individual boards 120, 220. For example, the internal and externals skins of the first board 120 and the second board 220 may provide additional strength that prevent bowing as opposed to boards having only a single skin on either the interior or exterior of the board.

The panel 100 may include an insulative insert 180 disposed within the cavity 170. An insulative insert might be formed of a less dense foam than the caps 160 such that the insert 180 has a greater insulative value than the caps 160. In some embodiments, the insert 180 may be a vacuum insulated panel (VIP). An exemplary VIP panel 280 may include a filler material 282 and a barrier or envelope 284. The filler material 282 may be a porous fabric or a porous foam material. The envelope 284 is disposed over the filler material 282 such that the filler material 282 is hermetically sealed within the interior of the VIP 280. The envelope 284 may be a thin metallic layer, e.g., an aluminum layer, that is impenetrable. During manufacturing of the VIP 280, a vacuum is applied such that when the envelope 284 is sealed over the filler material 282, the envelope 284 holds a vacuum therewithin. The filler material 282 prevents the envelope 284 from collapsing and maintains a volume within the envelope 284. The VIP 280 may have an R-value above R-15 per inch of thickness, e.g., R-20, R-30, R-40, R-45, or R-50 per inch of thickness. By isolating the VIP 280 within the cavity 170, the VIP 280 is protected by the first board 120 and the second board 220 to prevent the seal of the envelope 284 from being compromised and thus, prevent the VIP 280 from losing its vacuum. In some embodiments, the VIP 280 may include a vacuum port 286 that allows a vacuum to be drawn in the VIP 280. In certain embodiments, the VIP 280 includes a vacuum indicator 288 that provides an indication of a vacuum within the VIP 280. In particular embodiments, the vacuum port 286 and/or the vacuum indicator 288 may be accessible through the first board 120 or the second board 220. Examples of VIPs including VIPs with vacuum ports and vacuum indicators are disclosed in U.S. Patent Publication No. 2020/0407149, the entire contents of which are hereby incorporated by reference.

In certain embodiments, the envelope 284 may be formed of a non-combustible material or fabric. Such a non-combustible material may improve fire containment of the panel including a VIP 280. The non-combustible material may be a quartz fabric or other high-temperature fabric. The non-combustible material may be a fabric covering or encapsulating the VIP 280 to provide an impenetrable fire barrier. In embodiments, the VIP 280 may be formed of fireproof silica or glass fiber. However, when exposed to fire, the VIP 280 may lose structural integrity. An envelope 284 surrounding the VIP 280 may contain the material of the VIP 280 when exposed to fire to prevent destruction of the VIP 280 which may otherwise be destroyed when exposed to fire. The envelope 284 may encapsulate the VIP 280 to contain the contents of the insert and prevent burn-through. In some embodiments, the envelope 284 may include an inner layer that maintains the vacuum of the VIP 280 and an outer layer which is formed of a non-combustible material or fabric. In certain embodiments, the envelope 284 includes a single layer that is both non-combustible and maintains the vacuum of the VIP 280. In particular embodiments, the envelope 284 is integrated into the VIP 280 and in other embodiments the envelope 284 is formed separate from the VIP 280.

Additionally or alternatively, the panel 100 may include other inserts disposed within the cavity 170. For example, the panel 100 may include a fire-resistant insert or a signal-blocking insert. As the inserts within the cavity 170 are non-structural, a variety of different inserts may be disposed within the panel 100 to improve attributes of the panel or add functionality of the panel 100. In certain embodiments, the insert for the cavity 170 may be a solid insert made from insulating materials such as phenolic, fiberglass, or similar materials with high compressive strengths. In some embodiments, the inserts may include attachment points as necessary. In particular embodiments, it may be possible to form a VIP panel with a hole so that this type of insert can be used as an attachment point. In certain embodiments, attachment inserts may be within the cores 124, 224. In embodiments, the insert may not have the structural ability to support compressive loading or transmit shear loading between the boards. The construction detailed herein with respect to first board and a second board forming the cavity 170 may allow for less structural materials to be used in the cavity 170 as an insert.

Continuing to refer to FIG. 2, a method of optimizing skin thickness is disclosed in accordance with the present disclosure. The method may include determining a thickness of an outside facing skin 226 to be the thickest to resist impact from forklift tines, e.g., high speed impact from forklift tines. The thickness of an inside facing skin, e.g., skin 122, may be thinner than the thickness of the outside facing skin 226 as the inside facing skin 122 may be impacted by cargo pallets and low-speed forklift tines in contrast to high speed forklift tines. The interior skins 126 and 222 may have a thickness less than the skins 122 and 226 as the skins 126 and 222 are disposed in the interior of the panel and thus, will experience the lowest impact. The interior skins 126, 222 may provide a tension layer across the cores 124 and 224 to make a structurally stiff sandwich composite panel. The thickness of the skins 122, 126, 222, 226 may be selected to have enough stiffness relative to the shear strength of the foam to resist buckling during bending. For example, the outside facing skin 226 may have a thickness of 1.5 mm, the inside facing skin 122 may have a thickness of 0.7 mm, and the two interior skins 126, 222 may each have a thickness of 0.4 mm. In some applications, this construction may simultaneously address structural, impact, weight, and cost considerations.

In some embodiments, the method may include optimizing the thickness of the cores 124, 224 based on structural and impact scenarios of the panel 100. In some embodiments, the filler material 282 and the caps 160 may be optimized for weight, cost, and insulation value. The panel 100 may be configured such that most of the structural loading of the panel is carried by the two outer boards 120, 220 such that the filler material 282 and the caps 160 may be configured to increase an insulation value of the panel 100 and/or to provide sufficient compressive strength to avoid deformation or buckling of the boards 120, 220. The filler material 282 may be a Vacuum Insulated Panels to provide a high insulation to weight/thickness ratio and the caps 160 may be an expanded or extruded polypropylene foam to provide a durable and formable with a lower but still effective insulation value.

Figure 3:
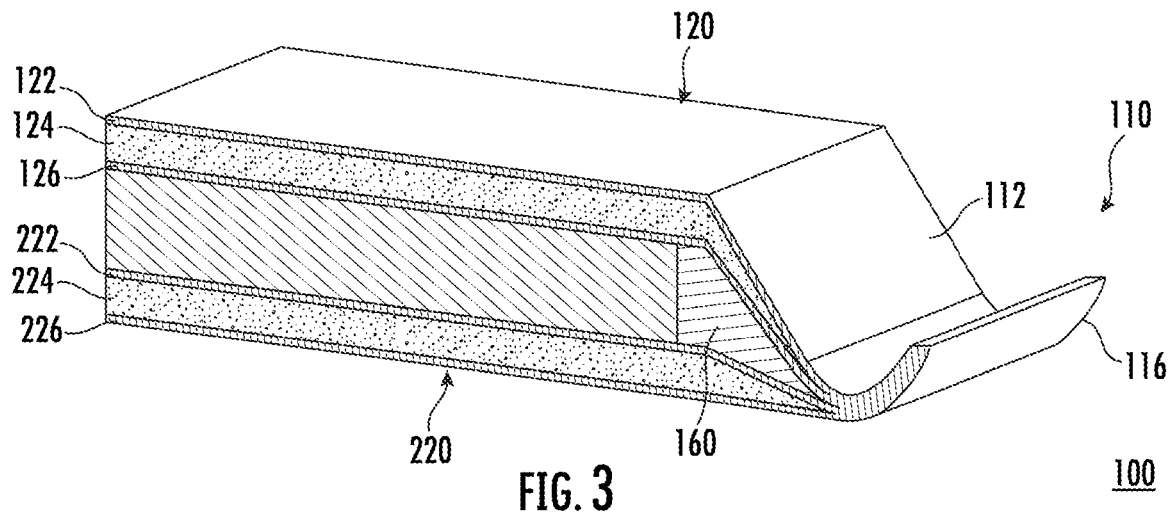
FIG. 3 is a cut-away, perspective view of a first edge profile of the structural panel of FIG. 2.

With additional reference to FIG. 3, the panel 100 may include one or more formed edges with an exemplary formed edge portion 110 being shown. The first board 120, the second board 220, and the caps 160 are formed of thermoplastic materials which allows for thermoplastic forming of the edge portion 110 of the panel 100. As shown, the formed edge portion 110 is formed by thermoforming portions of the first board 120, the second board 220, and the cap 160 along an edge of the panel 100 under heat and pressure. The formed edge portion 110 is compressed to have an angled section 112 and a profiled section 116. In the angled section 112, the first board 120, the second board 220, and the cap 160 are compressed towards the external or second skin 226 of the second board 220 such that a thickness of the panel 100 substantially linearly decreases as the panel 100 extends towards the edge of the panel 100. The profiled section 116 extends from the angled section 112 to form a terminal edge 118 of the panel 100. The profiled section 116 may have substantially constant thickness and form a variety of shapes. As shown, the profiled section 116 has an arcuate profile. Thermoforming the edge portions 110 of the panel 100 may increase or form the bond between the first board 120, the second board 220, and the caps 160. For example, skins of the boards 120, 220 may consolidate during the forming of the profiled section 116. The edge portion 110 may create a shear layer between the first board 120 and the second board 220 such that the boards 120, 220 act in concert with one another and have a high stiffness. This high stiffness may be enhanced at or adjacent the edge portions 110.

Figure 4:
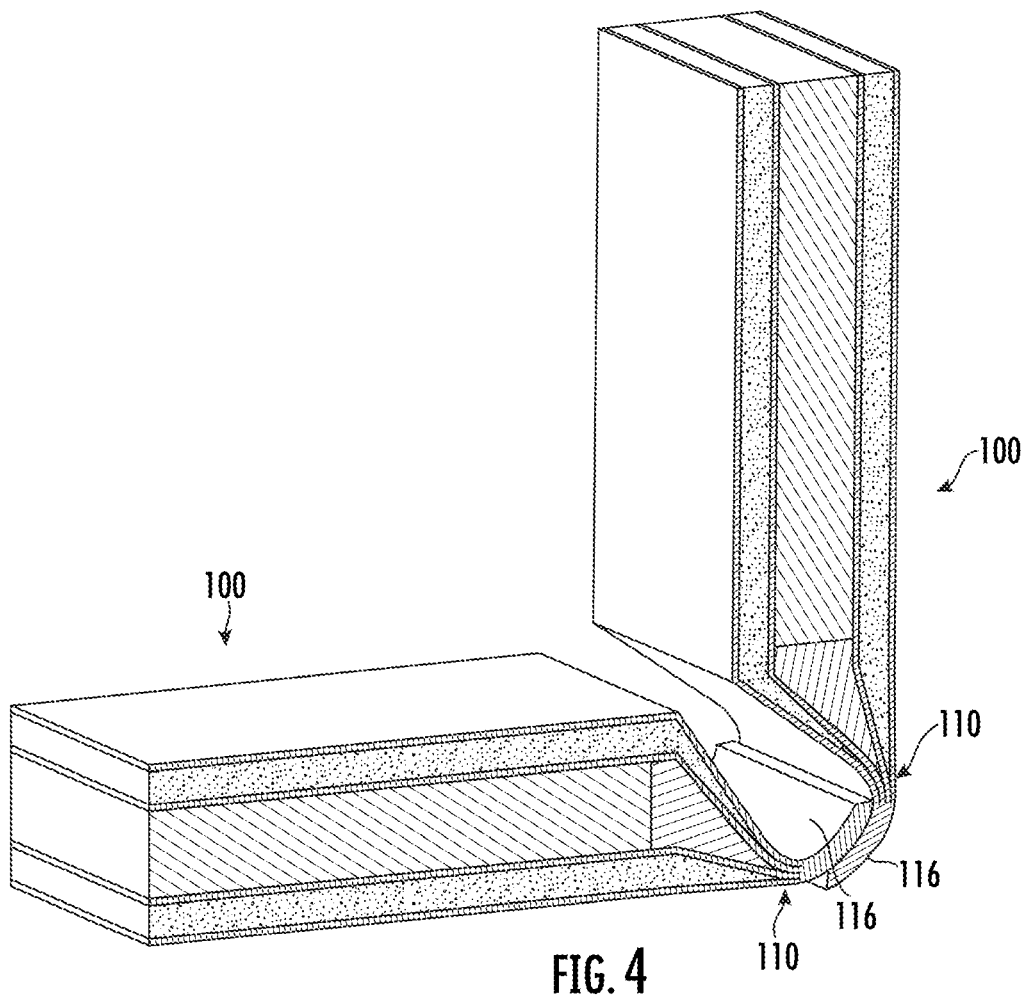
FIG. 4 is a cut-away, perspective view of two structural panels of FIG. 3 secured directly to one another without a frame.

With additional reference to FIG. 4, the edge portions 110 of adjacent panels 100 may be configured to fit together. The edge portions 110 of adjacent panels 100 may overlap one another such that a fastener may be passed through the edge portions 110 and in particular, the profiled sections 116 of the edge portions 110 to secure the edge portions 110 together. The fasteners may be selected from, but not be limited to, rivets, lockbolts, or threaded fasteners. As shown, the edge portions 110 are joined together at a 90-degree angle. However, the angle between the panels 100 may be any angle as long as the edge portions 110 are compatible with one another. As such, while the edge portions 110 shown in FIG. 4 are the same, it is contemplated that edge portions 110 having differing shapes may be compatible with one another and joined together in a similar manner to form a corner with or without a frame.

As shown in FIG. 4, the panels 100 may be joined together without the use of a frame. Allowing the panels 100 to be joined together without a frame may increase a life of a container as rigid frame members may be prone to damage. The shape and the materials of the edge portions may provide a durable and resilient corner that is capable of withstanding impacts in common usage of cargo containers including ULDs. In some embodiments, the profiled sections 116 may be disposed about a frame.

Figure 5:
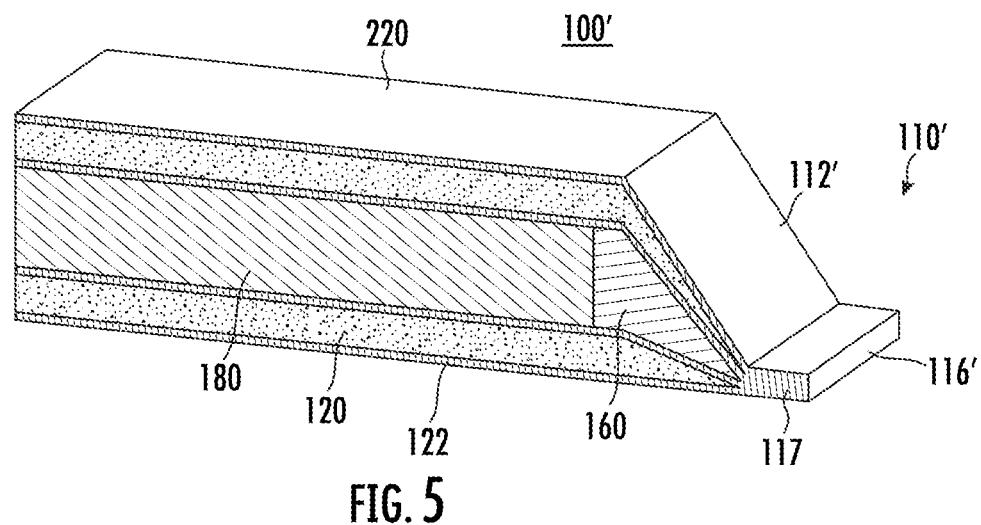
FIG. 5 is a cut-away, perspective view of a second edge profile of the structural panel of FIG. 2.
Figure 6:
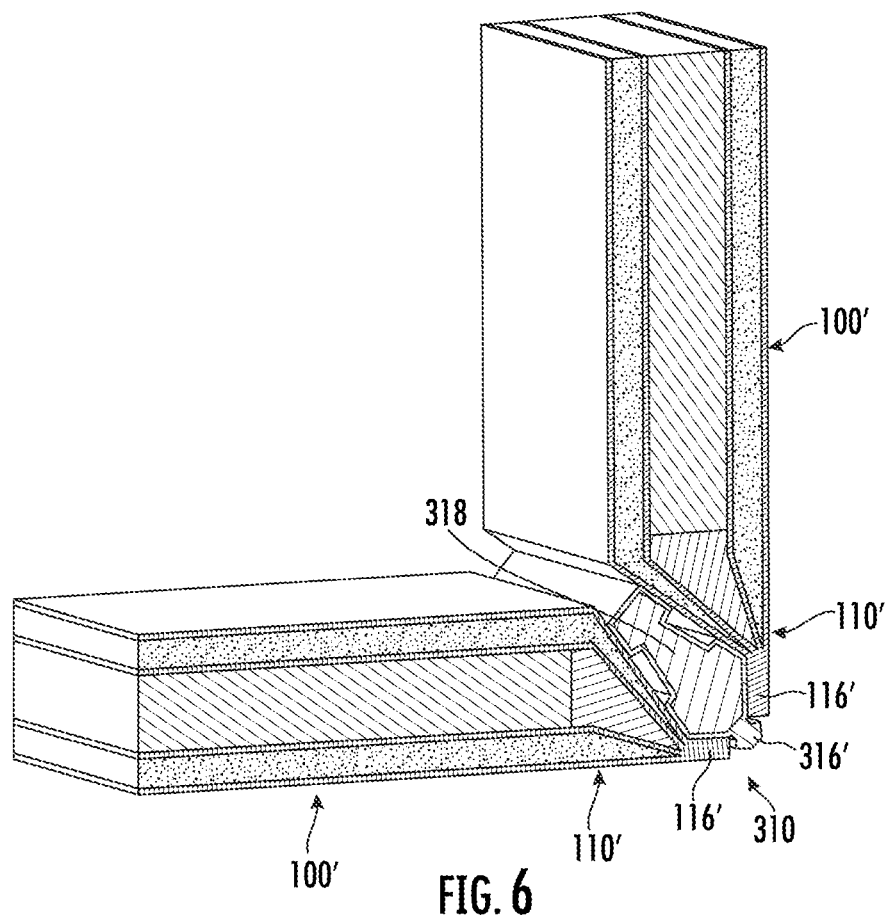
FIG. 6 is a cut-away, perspective view of two structural panels of FIG. 5 secured to one another with a frame element.

Referring now to FIGS. 5 and 6, a panel 100' is shown having a flat formed edge portion 110'. The panel 100' is similar to the panel 100 and as such only the differences will be detailed herein for brevity. The flat formed edge portion 110' has an angled section 112' and a profiled section 116'. The profiled section 116' is substantially flat and extending from exterior skin 122 of the first board 120 such that the outer surface 117' of the profiled section 116' is substantially planer with an outer surface of the exterior skin 122.

The profiled section 116' may be shaped to secure to a frame member 310 as shown in FIG. 6. The frame member 310 may be a pultrusion, metallic, or non-metallic with a profile to complement and fill an area between the edge portions 110 of adjacent panels 100'. In some embodiments the frame member 310 is formed of a fiberglass protrusion. Such pultrusions may be made with 60-80% by weight glass fiber with a polyurethane, polyester resin, or vinyl ester resin. Such a pultrusion may have a lower heat transfer constant than other structural materials and thus, reduce heat transfer through the frame member 310. Pultrusions may allow for resilience in both the panels and the frame to allow for deformation and recovery from impacts. In certain embodiments, the frame member 310 may be an extruded aluminum or other conductive material. The frame member 310 may have a rigid corner element 316' that is configured to be exposed to form a corner of a container or structure. The frame member 310 may be hollow and filled with an insulative material 318 such as a foam or an aerogel. The profiled sections 116' of the panels 100' are secured directly to the frame member 310 such that the panels 100' are secured together. The profiled sections 116' may be adhered, bonded, or fastened to the frame member 310. For example, a fastener may pass through the profiled sections 116' and into the frame member 310. The fasteners may be blind rivets that pass through the profiled sections 116' and into the frame member 310.

Figure 7:
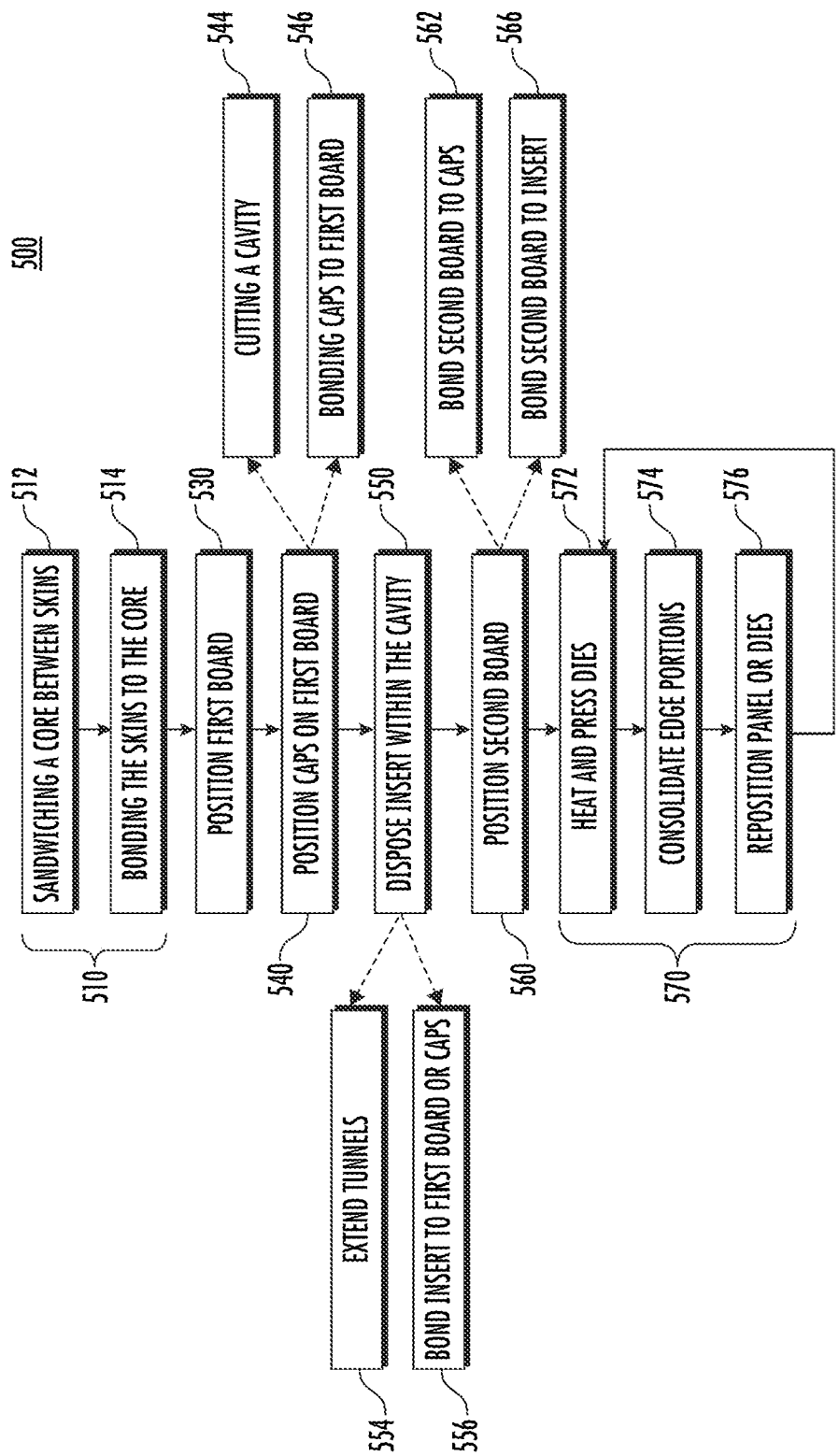
FIG. 7 is a flow chart of a method of manufacturing a structural panel in accordance with an embodiment of the present disclosure.

Referring now to FIG. 7, a method for manufacturing a panel is provided in accordance with embodiments of the present disclosure and is referred to generally as method 500 with reference to the boards 20 and the panels 100, 100' of FIGS. 1-6. To manufacture a panel, such as panel 100, a first structural board 120 having a first or external skin 122, a core 124, and a second or internal skin 126 is positioned with the external skin 122 facing downward (Step 530). One or more caps 160 are positioned on the internal skin 126 of the first structural board 120 at or adjacent edges of the first structural board 120 (Step 540). The one or more caps 160 may be individual pieces of foam which are arranged to form the cavity 170 therebetween. Alternatively, the caps 160 may be a single or unitary piece of foam with the cavity 170 cut therefrom. In particular embodiments, the method 500 includes positioning a monolithic piece of foam or multiple pieces of foam around the edges of the first structural board 120 and cutting a cavity 170 from the monolithic piece or multiple pieces of foam (Step 544). In some embodiments, positioning the caps 160 includes bonding the one or more caps 160 to the internal skin 126 with a bonding agent or an adhesive (Step 546).

With the one or more caps 160 positioned or bonded to the internal skin 126 of the first structural board 120, an insert may be disposed within the cavity 170 (Step 550). The insert may be an insulative insert (e.g., insulative insert 180, VIP panel 180), a fire-resistant insert, an attachment insert, a solid inset, or a signal-blocking insert. In some embodiments, the method 500 may include extending access tunnels through the first structural board 120 or the one or more of the caps 160 (Step 554). The access tunnels may provide access to one or more ports of an insert. For example, the access tunnels may provide access to a vacuum port of a VIP panel, an indicator of the insert, an antenna of an insert, or electronics of an insert. In certain embodiments, the insert may be bonded to the internal skin 126 of the first structural board 120 or the one or more of the caps 160 (Step 556).

With the insert disposed within the cavity 170, a second structural board 220 having a first or external skin 222, a core 224, and a second or internal skin 226 is positioned with the internal skin 226 opposing the internal skin 126 of the first structural board 120 (Step 560). The second structural board 220 is positioned such that the external skin 222 is opposite the external skin 122 of the first structural board 120 with the insert disposed between the first structural board 120 and the second structural board 220. The internal skin 226 may be bonded to the one or more caps 160 with a bonding agent or an adhesive (Step 562). In certain embodiments, the internal skin 226 may be bonded to the insert within the cavity 170 (Step 566). For example, an elastomeric layer or a structural adhesive may be used to bond the insert to the internal skins 126, 226. Bonding the insert to one or more of the internal skins 126, 226 may reduce movement of the insert within the cavity 170. Reducing movement of the insert within the cavity 170 may reduce abrasion between the insert and the surfaces defining the cavity 170, e.g., the internal skins 126, 226 and the caps 160. Bonding of the insert to the one or more of the internal skins may provide additional shear strength to the panel 100.

When the first structural board 120 and the second structural board 220 are positioned relative to one another such that the one or more caps 160 and the insert are sandwiched between the first structural board 120 and the second structural board 220, the edges of the first structural board 120 and the second structural board 220 are thermoformed to shape the edge portions 110 of the panel 100 and to bond the first structural board 120 to the second structural board 220 (Process 570). The edge portions 110 of the panel 100 may be thermoformed by heating a first die and a second die and pressing an edge of the first structural board 120 and the second structural board 220 together to form the edge portion 110 (Step 572). The first and second dies may be heated to a temperature and applied together such the first structural board 120, the second structural board 220, and a cap 160 sandwiched between the boards 120, 220 are melted and bonded together. During thermoforming, the skins of the panels 100 may slip relative to one another to form a new shape. As the new shape is formed, a new bond may be formed between the skins and the foam, e.g., the cores 124, 224 and the caps 160. The density of the foam in the edge portions 110 may be increased during thermoforming. For example, a foam having a density of 2% to 20% solid polymer may be increased to a density of 80% to 100% during thermoforming. In an exemplary embodiment, a 13 mm foam core of 64 kg/m$^3$ foam was melted and compressed to a consolidated thickness of 0.93 mm. In another exemplary embodiment, a 63 mm thick panel was thermoformed to have a profiled section with a thickness of 5 mm. The compression and consolidation during thermoforming may increase a compressive strength of the edge portions and may allow for a high fastener pull-out resistance.

Once the edge portions 110 are formed, the dies may be allowed to cool or be actively chilled such that the edge portions 110 are consolidated or solidified before being released from the dies (Step 574).

As the edge portion 110 is formed, the first structural board 120, the second structural board 220, and the cap 160 sandwiched between the boards 120, 220 are bonded together. As detailed above, the materials forming the first structural board 120, the second structural board 220, and the cap 160 may be compatible with one another such that as the edge portion 110 is formed, the first structural board 120, the second structural board 220, and the cap 160 are melted and bonded together. In some embodiments, as the edge portions 110 are formed, the cavity 170 is sealed along the edge portion 110.

With the edge portion 110 of the panel 100 formed, the panel 100 may be repositioned by rotating the panels or moving the dies such that another edge portion 110 of the panel 100 is positioned between the dies (Step 576). The panel 100 may be rotated or dies be moved such that an edge portion 110 opposite or adjacent the formed edge portion 110 is disposed between the dies. With the unformed edge portion 110 between the dies, the dies are heated and pressed together to form the edge portion 110 in a manner similar to that detailed above (Steps 572 & 574). This rotating of the panel 100 or the moving of the dies and forming of the unformed edge portions 110 is repeated until all the edge portions 110 of the panel 100 are formed. In some embodiments, one or more of the edge portions 110 are left unformed. In some embodiments, all the edge portions 110 are formed into the same profile. In certain embodiments, adjacent edge portions 110 are formed having differing profiles from one another. In particular embodiments, opposite edge portions 110 are formed having differing profiles from one another.

In certain embodiments, the method 500 includes forming the first structural board 120 and the second structural board 220 (Process 510). Forming the first structural board 120 and the second structural board 220 includes sandwiching a core 24 between a first skin 22 and a second skin 26 (Step 512). The core 24 is bonded to the first skin 22 and the second skin 26 such that the first skin 22 and the second skin 26 are capable of transferring forces therebetween through the core 24 (Step 514). Bonding the first skin 22 or the second skin 26 to the core 24 may be performed under heat and/or pressure to form a structural bond therebetween. The first skin 22 and the second skin 26 may be identical in thickness, material, and composition to one another or the first skin 22 and the second skin 26 may differ in thickness, material, or composition from one another. Step 512 and step 514 may be utilized to form the first structural board 120 and/or to form the second structural board 220. The first structural board 120 and the second structural board 220 may be identical to one another or may differ from one another. In embodiments, the skins 22, 26 of each structural board 120, 220 may be optimized for the position within the final panel 100. For example, the external skin 122 of the first structural board 120 may have a thickness greater than the internal skin 126 thereof. In some embodiments, the external skin 122 of the first structural board 120 may have a thickness greater than the external skin 222 of the second structural board 220. In certain embodiments, the internal skins 126, 226 have the same thickness while in other embodiments, the internal skins 126, 226 may have differing thicknesses.

With reference to FIG. 8, a method for joining a first panel 100 to second panel 100 in accordance with the present disclosure and is referred to generally as method 600. Joining the panels 100 includes aligning or positioning the first panel 100 adjacent the second panel 100 such that an edge portion 110 of each panel 100 is adjacent one another (Step 610). Positioning the panels 100 may include the edge portions 110 of the panels 100 overlapping one another such that a fastener may be passed through the edge portions 110 of each panel 100 to secure the panels 100 to one another (Step 612). In certain embodiments, joining the panels 100 may include placing a connector between the edge portions 110 (Step 614) and securing the first panel 100 to the connector (Step 616) and securing the second panel 100 to the connector (Step 618) such that the panels are secured to one another. Step 610 may be repeated until a shipping container, a truck body, a ULD, or a structure is formed.

The panels detailed herein may be constructed with structural characteristics suitable for other applications including cargo containers for use on trucks, ships, or trains. Such cargo containers by be in the form of a trailer for a truck, a shipping container for a ship, or a train car. In addition, the panels detailed herein may be suitable for buildings requiring insulated walls. For example, the panels detailed herein may be suitable for exterior walls or as an insulating layer on the outer surface of a wall. In addition, the panels detailed herein may be used to construct refrigeration units such as those used in hospitality, restaurant, or laboratory environments. When an enclosure or container is formed of the panels detailed herein, the enclosure or container may maintain an elevated or a reduced temperature to an environment surrounding the enclosure or container with minimal transfer of energy through the panels. In addition, the panels detailed herein may be used to add functionality to structures without compromising the structure.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A panel comprising:
    a first board comprising a first core sandwiched between and bonded to a first skin and a second skin;
    a second board comprising a second core sandwiched between and bonded to a third skin and a fourth skin; and
    an edge cap positioned between and bonded to the first board and the second board such that a cavity is defined by the first board, the second board, and the edge cap, the cavity configured to receive an insert, the cavity being isolated from forces transferred between the first board and the second board.

2. The panel according to claim 1, wherein the edge cap is configured to transfer shear forces between the first board and the second board.

3. The panel according to claim 1, further comprising an insert disposed within the cavity.

4. The panel according to claim 3, wherein the insert is an insulative insert, a fire-resistant insert, or a signal-blocking insert.

5. The panel according to claim 4, wherein the insert is a vacuum insulated panel.

6. The panel according to claim 3, wherein the insert is bonded to the first board or the second board.

7. The panel according to claim 3, wherein the insert is encapsulated in a non-combustible fabric to contain the contents of the insert and prevent burn-through.

8. The panel according to claim 1, wherein portions of the first board, the second board, and the edge cap are thermoformed into an edge profile.

9. The panel according to claim 8, wherein portions of the first skin, the second skin, the third skin, and the fourth skin are consolidated together to form the edge profile.

10. The panel according to claim 8, wherein the edge profile includes an arcuate section or a flat edge section.

11. The panel according to claim 1, wherein the first skin has a first thickness and the second skin has a second thickness different from the first thickness.

12. The panel according to claim 1, wherein the first skin has a first composition and the second skin has a second composition different from the first skin.

13. A cargo container comprising;
    a first panel according to claim 1, the first panel having a first edge portion; and
    a second panel according to claim 1, the second panel having a second edge portion, the second panel joined to the first panel such that the first edge portion is adjacent the second edge portion.

14. The cargo container according to claim 13, wherein the first edge portion is secured directly to the second edge portion.

15. The cargo container according to claim 13, further comprising a frame element disposed between the first edge portion and the second edge portion, the first edge portion secured directly to the frame element, the second edge portion secured directly to the frame element.

16. A panel comprising:
    a first board comprising a first core having a first skin bonded on a first side of the first core and a second skin bonded on a second side of the first core opposite the first side of the first skin;
    a second board comprising a second core having a third skin bonded on a first side of the second core and a fourth skin bonded on a second side of the second core opposite the first side of the second skin; and
    a cap positioned between and bonded to the first board and the second board such that a cavity is defined by the first board, the second board, and the cap, the cap configured to transfer shear forces between the first board to the second board.

17. The panel according to claim 16, further comprising an insert disposed within the cavity, the insert isolated from shear forces of the first board and the second board.

18. The panel according to claim 16, wherein the first board, the second board, and the edge cap are thermoformed into an edge profile.

19. A method of manufacturing a panel, the method comprising:
    positioning an end cap on a first board, the first board having a first skin, a second skin, and a first core disposed between and bonded to the first skin and the second skin;
    positioning a second board on the end cap such that a cavity is defined by the end cap, the first board, and the second board, the second board having a third skin, a fourth skin, and a second core disposed between and bonded to the third skin and the fourth skin; and
    thermoforming a portion of the first board, the second board, and the end cap such that the first board, the second board, and the end cap are bonded together to form an edge profile of the panel.

20. The method according to claim 19, wherein thermoforming the portion of the first board, the second board, and the end cap includes consolidating the first skin, the second skin, the third skin, and the fourth skin in the edge profile of the panel.

* * * * *